United States Patent
Guns et al.

(10) Patent No.: US 12,286,684 B2
(45) Date of Patent: Apr. 29, 2025

(54) COPPER SMELTING PROCESS

(71) Applicant: Aurubis Beerse, Beerse (BE)

(72) Inventors: Walter Guns, Beerse (BE); Niko Mollen, Beerse (BE); Bert Coletti, Beerse (BE); Steven Smets, Beerse (BE); Andy Breugelmans, Beerse (BE); Jan Dirk A. Goris, Beerse (BE); Yves De Visscher, Beerse (BE); Charles Geenen, Beerse (BE)

(73) Assignee: Aurubis Beerse, Beerse (BE)

( * ) Notice: Subject to any disclaimer, the term of this patent is extended or adjusted under 35 U.S.C. 154(b) by 396 days.

(21) Appl. No.: 17/773,651

(22) PCT Filed: Nov. 20, 2020

(86) PCT No.: PCT/EP2020/082826
§ 371 (c)(1),
(2) Date: May 2, 2022

(87) PCT Pub. No.: WO2021/099538
PCT Pub. Date: May 27, 2021

(65) Prior Publication Data
US 2022/0389538 A1    Dec. 8, 2022

(30) Foreign Application Priority Data
Nov. 22, 2019    (EP) ..................... 19210921

(51) Int. Cl.
C22B 15/00    (2006.01)
C22B 7/00    (2006.01)
(52) U.S. Cl.
CPC .......... C22B 15/0056 (2013.01); C22B 7/001 (2013.01); C22B 15/0052 (2013.01)

(58) Field of Classification Search
CPC ............ C22B 15/0028; C22B 15/0052; C22B 15/0056; C22B 7/001
See application file for complete search history.

(56) References Cited

U.S. PATENT DOCUMENTS 3,682,623 A    8/1972    Dierckx et al.
3,954,448 A    5/1976    Nakabe
(Continued)

FOREIGN PATENT DOCUMENTS

CN    101871050 A    10/2010
DE    102012005401 A1    9/2013
(Continued)

OTHER PUBLICATIONS

International Search Report for International Application No. PCT/EP2020/082826 dated Jan. 29, 2021, PCT Receiving Office, 3 pages total.

*Primary Examiner* — Nicholas A Wang
(74) *Attorney, Agent, or Firm* — CHRISTENSEN O'CONNOR JOHNSON KINDNESS PLLC

(57) ABSTRACT

Disclosed is a process for recovering copper from secondary raw materials including in a feed batch smelting in a furnace a feedstock including copper oxide and elemental iron for forming a concentrated copper intermediate, whereby heat is generated by the redox reactions converting iron to oxide and copper oxide to copper, whereby copper collects in a molten liquid metal phase and iron oxides collect in a supernatant liquid slag phase, whereby at the end of the batch the liquid phases separate and may be removed from the furnace as smelter slag and as the concentrated copper intermediate, wherein during the smelting step an excess of elemental iron is maintained in the furnace relative to the amount required for completing the redox reactions, and
(Continued)

further heat input is provided by the injection of an oxygen containing gas for oxidizing the excess iron.

15 Claims, 1 Drawing Sheet

(56) References Cited

U.S. PATENT DOCUMENTS

| | | | | |
|---|---|---|---|---|
| 6,042,632 | A | * | 3/2000 | George ................ C22B 15/006 75/382 |
| 2001/0049982 | A1 | | 12/2001 | Hirai et al. |
| 2017/0198371 | A1 | | 7/2017 | Mehmet et al. |

FOREIGN PATENT DOCUMENTS

| | | | |
|---|---|---|---|
| EP | 0185004 | A1 | 6/1986 |
| GB | 2462481 | A | 2/2010 |
| JP | H0515769 | B2 | 3/1993 |
| JP | 2003253349 | A | 9/2003 |
| WO | 2019115540 | A1 | 6/2019 |

* cited by examiner

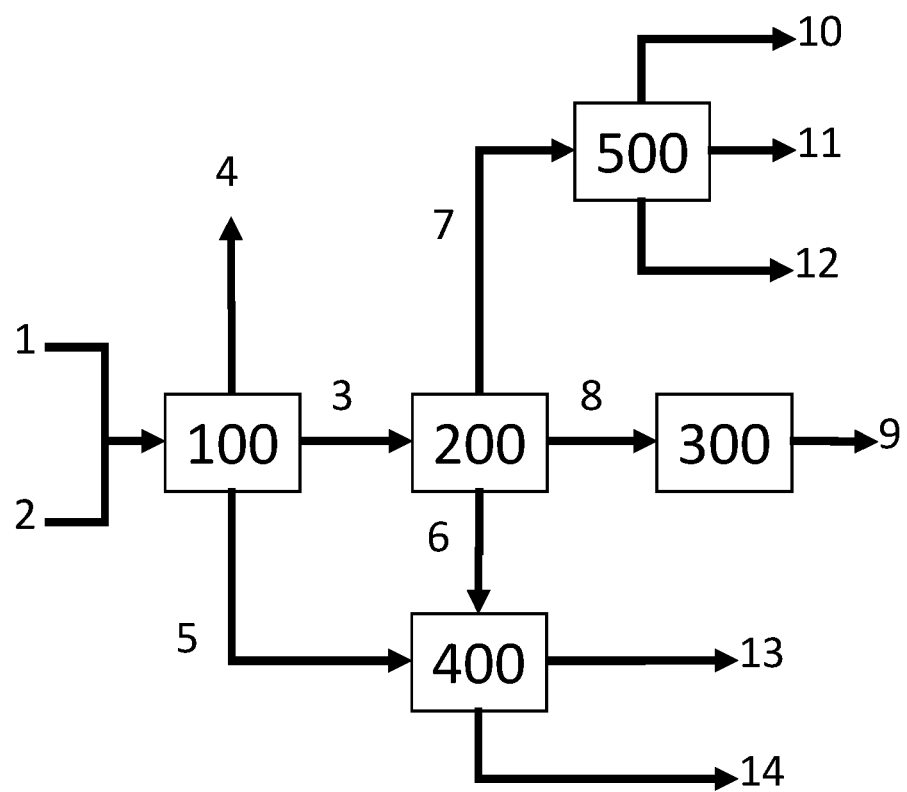

COPPER SMELTING PROCESS

CROSS REFERENCE TO RELATED PATENT APPLICATIONS

This application is a National Stage International Application No. of PCT/US2020/082826, filed Nov. 20, 2020, which claims the benefit of European Patent Application No. 19210921.3, filed Nov. 22, 2019, the entire disclosures of which are hereby incorporated by reference in their entirety for all purposes.

FIELD OF THE INVENTION

The present invention relates to the recovery of copper (Cu) together with other non-ferrous metals such as tin (Sn), lead (Pb), nickel (Ni) and zinc (Zn), primarily from secondary feedstocks, by means of pyrometallurgical process steps. The present invention relates preferably to secondary feedstocks, also known as recyclable materials. Recyclable materials, may for instance be by-products of metal producers, waste materials and end-of-life materials.

BACKGROUND OF THE INVENTION

The present invention is primarily concerned with a well-known pyrometallurgical step in the production of copper, i.e. the smelting step. Depending on the source of the feedstocks, the smelting step may be further specified as a primary or a secondary smelting step.

Smelting is a process in which heat and chemical agents are applied, most typically in a primary smelter to metal ore, to extract a base metal. In more technical detail, smelting is a process in which metal-containing solids are liquefied using a chemical reaction that renders metals as a result. It is used to extract many metals from the inert gangue component of the ore, including silver, iron, copper, and other base metals. It is a form of extractive metallurgy in which chemical reactions are used to drive off other elements as gases or as slags, leaving behind a liquid bath containing metal in elemental or in a chemically bound form, such as bound with sulphur and known as a "matte". The elemental metal is retrieved in a separate molten metal phase. Also the matte typically forms a separate liquid phase. Most ores are impure and it is often necessary to use flux, such as limestone or silica, to remove the accompanying rock gangue as part of another separate liquid phase forming the typical by-product named "slag".

Also in the recovery of copper from secondary materials, smelting may be used as a first step to recover a concentrated copper phase from secondary raw materials which may be too much contaminated and/or of which the copper content may be too low for being directly suitable as feed for being refined into anode copper quality. Such secondary raw materials are typically richer in copper than the primary copper sources such as copper ore or even as the copper concentrate intermediate which is usually first derived from the ore by e.g. mineral flotation upstream of the smelting step. A part of the copper in the secondary material may also already be present in the elemental form, and hence not chemically bound. For these reasons the operating conditions in a copper smelting step running on secondary raw materials are distinctly different from those in a primary copper smelting step operating on a copper concentrate or occasionally on a copper ore.

In a primary copper smelter, the typical starting materials are copper containing sulphides such as chalcopyrite (CuFeS$_2$), bornite (Cu$_5$FeS$_4$) and chalcocite (Cu$_2$S). Their reaction with oxygen (oxidation) drives off S as SO$_2$ in the off-gas, and forms a "matte" phase (Cu$_2$S·FeS) together with a slag phase (FeO·SiO$_2$), the latter being formed by the reaction with added silica. In a second step, typically also in the smelting furnace, the FeS is driven off by a further reaction with oxygen and silica to form more slag and more SO$_2$ gas, leaving a so-called "white metal" (Cu$_2$S) typically with less than 1% remaining Fe. The latter is then oxidized with an oxygen containing gas, preferably air, according to the reactions $$Cu_2S + O_2 \rightarrow 2Cu + SO_2,$$

$$Cu_2S + 3/2 O_2 \rightarrow Cu_2O + SO_2$$

$$Cu_2S + 2Cu_2O \rightarrow 6Cu + SO_2)$$

This primary copper smelting process is typically performed in a so-called "Pierce-Smith" converter, to form so-called "Blister copper", which includes Ni and precious metals, a slag including most of the Fe, Zn together with 2-15% Cu, furnace dust (including most of the Sb, As, Bi, Cd, Pb), and off-gas (again containing SO$_2$). The large amount of S that comes free in these process steps is driven off as SO$_2$ and is recovered in the form of sulphuric acid. The primary copper smelter step is thus typically and primarily a strong oxidation step. Primary copper smelting is for instance described in JPS61531 (A) or its granted version JPH0515769 (B2). Processing the copper matte phase is for instance described in CN101871050 A and GB2462481 A. U.S. Pat. No. 3,954,448 describes a process for further processing the copper matte or a slag from a primary copper smelting step.

JP 2003253349 describes a primary copper smelting process wherein the matte raw material also contains iron sulphide. In a first step, this iron sulphide is selectively oxidised to iron oxide using oxygen enriched air. The iron oxide and added silica end up in a separate slag phase that is removed from the furnace before the copper sulphide is further processed in a second step. The amount of iron sulphide available and its reaction to FeO may not be sufficient for generating the reaction heat necessary for maintaining the furnace temperature during this first step, in particular when cold raw materials are to be processed. In the first step, per ton of matte processed, an amount of extra metallic iron is added to counter the further oxidation of iron into magnetite (Fe$_2$O$_3$), which would otherwise increase the viscosity of the slag and impair the subsequent phase separation and slag removal at the end of the first step. Under the oxidizing conditions that are as usual governing in the primary copper smelting step, the extra metallic iron is oxidized and this reaction generates extra heat.

The metals in the typical starting materials for a secondary copper smelting step are primarily present as oxides, though small amounts of sulphides may be present. An important difference with a primary copper smelting step is therefore the absence of any copper matte as intermediate. Some of the copper in the raw materials may actually already be present in its elemental form, but too low in concentration or in a form less suitable for pyrometallurgical copper refining and even less for hydrometallurgical recovery (leaching+electrowinning). The copper in the oxides is then reduced in the smelting step by the addition of a reducing agent, e.g. a source of carbon, such as coke, and/or metallic iron, typically in the form of iron scrap. A further major difference with a primary copper smelting step thus includes the reducing conditions under which the smelting step on secondary raw materials is operated.

U.S. Pat. No. 3,682,623 (Ludo Dierckx et al) describes a copper refining process starting from secondary raw materials of which the first step is a melting step, i.e., a reduction step, which is performed in a melting furnace wherein copper-bearing materials are heated together with solid material containing metallic iron, under an oxygen-enriched neutral flame, and with mild agitation from this charge a bath is produced including a slag phase. A small amount of alkaline or neutral flux may be added to optimize specific gravity and viscosity of the slag formed. Also extra silica may be added to absorb iron compounds produced in the reduction reactions. As the temperature of the melting bath in the furnace increases, it is stated that chemically combined copper, lead, tin or nickel in the charge are reduced with solid-state metallic iron, forming a molten metal, called "black copper", and a molten slag containing iron silicate. The typical process reactions are stated to include:

$$MeO + Fe \rightarrow FeO + Me$$

$$(MeO)_x SiO_2 + xFe \rightarrow (FeO)_x SiO_2 + xMe$$

$$xFeO + SiO_2 \rightarrow (FeO)_x SiO_2$$

These reactions confirm that the so-called "melting" step of U.S. Pat. No. 3,682,623, qualifies as a "smelting" step in the context of the present document. These reactions are exothermic, and it is stated that the reaction heat rapidly increases the temperature of the charge. Once the material has melted to the point that it will flow readily along the vessel wall, vessel agitation may be increased. At the end of the reduction step, a black copper and a melting slag are formed, which may be separated from each other by gravity and which may be removed from the furnace separately.

Throughout the reduction operation, the temperature is controlled as low as possible consistent with the maintenance of a fluid slag. The fuel supply must be regulated to prevent the temperature of the reaction mass from exceeding about 1300° C. for any substantial period during the melting furnace cycle. Preferably the temperature should be maintained not substantially higher than the temperature at which the slag becomes substantially fluid. A bath temperature of about 1180° C. is stated to be satisfactory for normal charge materials, but lower temperatures may be employed if borax is used as a fluxing agent.

Low temperature not only minimizes the vaporization of lead and tin, but limits the dissolution of solid iron in the molten copper produced. It is stated to be essential that a substantial amount of solid-state iron be present to provide rapid and complete reduction of the slag. Dissolution of iron should also be minimized to maintain high solubility of lead and tin in the black copper produced. As the reduction reactions proceed and the solid iron-bearing material gradually dissolves in the molten metal, additional solid material containing metallic iron may advantageously be added after melting is complete to effect final reduction of copper, tin, lead and zinc remaining in the slag. Overall an excess of iron is used which remains in the furnace, at least part of it dissolved in the black copper. Zinc is volatilized out of the furnace, but a considerable amount of zinc also remains in the black copper at the end of the melting step.

At the end of the so-called melting step, when the final reduction step was complete, as indicated by further slag analysis, the melting slag was top poured from the furnace and granulated. After pouring the melting slag from the furnace, the resulting black copper was subsequently in the same furnace pre-refined, together with more secondary raw materials added that were fairly rich in copper already, and this pre-refining was using a strongly oxidizing flame. This pre-refining step is thus not anymore part of the upstream melting step, which is a reduction step that is characterized by a reducing environment.

In Example 1 of U.S. Pat. No. 3,682,623, the charge to the melting furnace is melted "under a neutral, oxygen-enriched flame" (col. 15, lines 1-2), which is understood as a neutral flame, using oxygen-enriched air. After adding an additional amount of copper/iron scrap, the slag was further reduced under a slightly reducing flame (col. 15, l. 33-35). Most of the zinc present was evaporated and recovered as dust in the exhaust system. Subsequently the slag was top poured and granulated.

DE 10 2012 005 401 A1 describes a bath smelting furnace in which a copper containing substance, preferably a copper containing secondary raw material, is subjected to a smelting process that is fuelled by oil and/or gas together with air and/or oxygen that are injected into the bath by means of a submerged injection lance. The smelting step produces a primary slag which has comparatively few impurities and which is discharged from the process, and also a second slag for further processing that is transferred from the bath smelting furnace into a rotating drum furnace. The rotating drum furnace is provided with a burner at one end which may be supplied with oil or gas and optionally also with oxygen from an oxygen storage. The further processing occurs stepwise and produces in sequence anode-grade copper, black copper, a raw tin mixture that may be further treated with silicon, and a final slag. Coal is introduced into the rotating drum furnace in each of the process steps. In every step of the process of DE 10 2012 005 401 A1, the furnace is heated by burning a fuel with air and/or oxygen.

EP 0185004 describes a process in which an oxidative smelting step, performed on secondary materials, in an attempt to increase the yield of valuable metals, leads to a liquid bath from which sequentially in two steps tin and zinc are removed by fuming, after which an iron containing slag is tapped off and a copper containing metal phase is retained. This metal phase is further treated to separate off first a lead-silicate slag, a blister copper low in nickel, and a copper-nickel oxide bath which can be subsequently reduced to form a copper-nickel alloy.

US 2017/0198371 A1 is concerned with the possibly large variations in the organic constituents in a smelter feedstock, and its effects on process throughput. The document proposes, in batch mode, to remove organic components in a first stage, while already producing a so-called "black copper", which in a subsequent stage may be converted into blister copper by further oxidation. The other product of the first step is a final, metal-poor slag. The document states that "an appropriately adapted quantity of oxygen is blown into the process chamber". In this process, the "composition of the slag and the content of valuable metals still present in it are monitored during the melting process by taking samples and analyzing them rapidly".

The drawback of the smelting step of U.S. Pat. No. 3,682,623 is that during most of the smelting step a significant part of the heat input is provided by the neutral flame, running on oxygen-enriched air. This requires a large source of fuel, of air and of pure oxygen, with its associated complexity, extra equipment and operating burdens.

The heat input from the flame above the furnace into the melting bath leaves things to be desired, because the heat has to be transferred from the combustion gases into the liquid bath. The heat transfer from gas to liquid is rather slow, and the contact surface area between the burner in the top of the furnace and the liquid bath remains limited. With a submerged burner, gravity forces the gas to quickly rise up and leave the liquid phase. There is thus relatively little contact time between the combustion gases and the melting bath. The heat input from the flame into the bath is thus mainly by radiation. Consequently the heat input by the flame is not highly effective and a major portion of the heat input potential from the flame ends up leaving the furnace in the exhaust gases, where it represents an extra burden for the exhaust gas cooling system.

The high volumes of flue gases generated by the flame also require that a large exhaust gas treatment system is installed and operated.

The inventors have found that there remains a need for a more convenient and more effective input of heat into a secondary copper smelting furnace, while maintaining or even improving the means for controlling the temperature in the smelting step.

The present invention aims to obviate or at least mitigate the above described problem and/or to provide improvements generally.

SUMMARY OF THE INVENTION

According to the invention, there is provided a process as defined in any of the accompanying claims.

In an embodiment, the present invention provides a process for the recovery of copper from secondary raw materials comprising the step of, in at least one feed batch, smelting a feedstock comprising the raw materials in a furnace for the recovery from the furnace of a concentrated copper intermediate, whereby the feedstock of raw materials is introduced gradually into the furnace, the feedstock comprising copper, and optionally at least one metal that under the furnace operating conditions is more noble than copper, at least partly as an oxide, whereby the feedstock further comprises iron, and optionally at least one metal or compound that under the furnace conditions is at most as noble as iron or zinc, the iron and metal at most as noble as iron or zinc at least partly being present in the elemental form, whereby heat is generated inside the furnace by the redox reactions converting elemental iron and metals or compounds at most as noble as iron or zinc to oxides and converting oxides of copper and of metals more noble than copper to elemental metal, whereby the elemental metals at least partly collect in a molten liquid metal phase and the oxides at least partly collect in a supernatant liquid slag phase, whereby the liquid phases are able to separate out and at the end of the smelting step at least one of the liquid phases is at least partially removed from the furnace as a smelting slag and/or as the concentrated copper intermediate, characterized in that during the smelting step an excess of the elemental form of iron and of metals or compounds that are under the furnace conditions at most as noble as iron or zinc is maintained in the furnace relative to the amount required for completing the redox reactions, and further heat input into the furnace is provided during the smelting step by the injection of an oxygen containing gas for the oxidation of the excess of iron and of metals or compounds at most as noble as iron or zinc present in the furnace and optionally for the combustion of a combustible source of carbon and/or hydrogen that may in addition be introduced into the furnace.

Preferably the excess of iron and optionally of metals or compounds that are under the furnace conditions at most as noble as iron or zinc is maintained by adding into the furnace as part of the feedstock on purpose at least one extra raw material that is rich in iron and/or at least one metal or suitable compound.

The applicants have found that maintaining the excess of iron and optionally other metals and/or compounds that are at most as noble as iron or zinc in the furnace, provides a very convenient method for controlling a highly controllable part of the heat input and therefore the temperature inside the smelting furnace, i.e. by controlling the injection into the furnace of the oxygen containing gas, because the oxygen in this gas is what is made available for the oxidation of the excess of elemental iron and/or other metals or compounds at most as noble as iron or zinc. The applicants have found that this method allows for a direct, accurate and correct dosing of the input of oxygen for generating a part of the reaction heat, and more advantageously a part that becomes readily, directly and fully available in the liquid bath inside the furnace at the level where it is most desired, i.e. the interface between the metal phase and the slag phase where the redox reactions and the phase changes are supposed to be occurring.

The heat from the oxidation of iron and other metals and/or compounds at most as noble as iron or zinc by the reaction with oxygen from the oxygen containing gas is generated in the bath itself, and does not require any extra heat transfer step. This heat of reaction is fully and immediately dissipated into the smelting bath.

The applicants have found that the temperature control in the smelting furnace, thanks to the present invention, is easy and very responsive. This is highly advantageous, because when the temperature in the molten liquid bath increases, more iron dissolves into the molten liquid metal and becomes available for oxidation with the available oxygen, which in case of abundant presence of oxygen would generate even more heat and would be able to create a temperature runaway.

The present invention is able to avoid this risk for a temperature runaway because in the process according to the present invention, the input of oxygen as part of the oxygen containing gas is very controllable. If the feedstock at a particular moment introduces a higher amount of oxygen that becomes available for participation in the redox reactions, and if the heat generated by these additional redox reactions would lead to a temperature increase of the smelting bath, the temperature of the smelting bath may readily be brought under control by reducing the injection rate of the oxygen containing gas, and any risk for a temperature runaway is readily avoided or at least significantly reduced.

Another advantage of the present invention is that the oxidation of iron and other metals or compounds that are at most as noble as iron or zinc typically does not generate high amounts of off-gas, unlike the combustion of natural gas or another carbon and/or hydrogen containing fuel, and that the furnace exhaust gas treatment system associated with the smelting equipment in which the process according to the present invention is operated, may be designed smaller and therefore demands a lower investment cost plus consumes a lower operating cost during operation. Another advantage of the lower off-gas volume is that typically also less valuable tin, lead and zinc are evaporated and therefore do not need to be captured in the exhaust gas treatment system.

The applicants have therefore found that the heat generation by the oxidation of e.g. the excess iron to iron oxide by injecting oxygen gas into the melting bath is much more effective, and also much more efficient, than burning a flame based on a combustible source of carbon and/or hydrogen in the furnace. The applicants have assessed that about 80% of the injected oxygen is reacting with compounds in the liquid bath of the furnace, and that the heat that these reactions generate stays in the liquid bath, which is a very high yield in comparison with the heat that may be contributed by the combustion of a hydrocarbon fuel such as natural gas, even if this combustion is running on pure oxygen or oxygen enriched air. The applicants believe that this difference is because the conversion of iron to iron oxide occurs in the liquid bath itself, while the combustion of natural gas occurs in the gas phase and the combustion heat still has to be transferred into the liquid phase in order to be contributing to the enthalpy content of the liquid bath. In addition, such a combustion may not necessarily be complete.

The applicants have also found that suitable sources of elemental iron, and of metals or compounds at most as noble as iron or zinc, are readily available from a wide number of sources and may readily be obtained at economic conditions that make this method of heat input economically more advantageous than heat input by means of a neutral flame, even on the basis of operating costs alone. In addition, the carbon footprint of the process according to the present invention is lower as compared to the process described in the prior art above.

Although it is included in the scope of the present invention, the applicants prefer not to operate the option to provide a portion of the total heat input into the furnace by the combustion of a combustible source of carbon and/or hydrogen in the furnace. The applicants have found that under particular economic conditions, it may be advantageous to operate this option, but the applicants always, also when this option is operating, prefer to control the furnace temperature by the injection of the oxygen containing gas, because of its higher level of convenience, the higher ease of control and the lower risk for a temperature runaway.

Another advantage of the present invention associated with the excess presence of iron dissolved in the molten liquid metal layer inside the furnace is that a layer of solid iron and/or iron oxide forms around submerged tuyeres through which the oxygen containing gas may be introduced and form an extra protection of these tuyeres against wear, because these tuyeres are cooled by the gas flow typically being cooler than the smelting bath. This protection layer typically takes the shape of a hollow mushroom and is formed because the tuyeres itself are colder, and the molten liquid metal around the tuyeres becomes cooler, whereby the solubility of iron in the concentrated molten liquid copper phase is reduced, iron precipitates and adheres to the outer surfaces of the tuyere except for the mouth through which the gas is injected.

The high responsiveness of the temperature control is advantageous, because in case the temperature of the molten liquid increases, this protective layer may dissolve again and the tuyere may lose its protective layer, resulting in possible severe damage and production losses. The high responsiveness of the temperature control system brings the effect that the risk for such tuyere damage, and the associated production loss, may be strongly reduced, and preferably avoided.

The applicants have found that the beneficial effects of the present invention lead to a more stable and reliable smelting step. The smelting step is typically a very early step in a more complex overall pyrometallurgical process.

The overall process may for instance process the products of the smelting step according to the process according to the main claim further into derivatives.

The slag from the smelting step may preferably be further treated, e.g. by fuming to produce a slag that not only raises less concerns when landfilled and/or when used in higher value end-uses, such as described further in this document.

The concentrated copper intermediate, preferably after having been separated from the smelting slag formed in the smelting step, may be further treated, e.g. by refining, to produce a more concentrated refined copper product that becomes suitable for higher value end-uses, optionally by casting copper anodes as feedstock for electrolysis that may eventually lead to high purity copper cathodes that comply with many if not all of the current industrial standards for the more demanding end-uses for copper.

The further treatment of the concentrated copper intermediate and/or of the slag from the smelting step may lead to other valuable by-products of the refined copper product.

Such a valuable by-product may for instance be a crude solder stream that may be derived from the copper refinery slag which may originate from the refining of the concentrated copper intermediate. Such a crude solder may be further refined and/or tuned, i.e. cleaned up by the removal of elements that could affect the downstream processing and/or impair or prohibit particular applications of the final products derived from the solder stream. These valuable by-products may for instance include at least one of the products belonging to the list consisting of a soft lead prime product, a hard lead prime product, a silver-rich anode slime product, and high grade tin prime product, as explained further in this document.

The applicants submit that the advantageous effects brought by the present invention do transfer all the way through down to the production of the derivatives of the products of the smelting step that have been listed above. The improved stability and reliability of the smelting step brings the advantage that the downstream processes that produce these derivatives are assured of a more stable and reliable feed stream originating from the smelting step, which makes their own operation more stable and reliable. This allows the production of final products having a more stable and reliable quality. It further allows to reduce the process monitoring burden and/or the operator attention, and increases the possibility for electronically monitoring and controlling each step in these processes as well as the overall process.

BRIEF DESCRIPTION OF THE DRAWINGS

FIG. 1 shows a process flow sheet including the process according to the invention as part of an overall process for the recovery of non-ferrous metals from secondary feedstocks.

DETAILED DESCRIPTION

The present invention will hereinafter be described in particular embodiments, and with possible reference to particular drawings, but the invention is not limited thereto, but only by the claims. Any drawings described are only schematic and are non-limiting. In the drawings, the size of some of the elements may be exaggerated and not drawn to scale for illustrative purposes. The dimensions and the relative dimensions in the drawings do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than those described and/or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein may operate in other orientations than described or illustrated herein.

The term "comprising", as used in the claims, should not be considered as being limited to the elements that are listed in context with it. It does not exclude that there are other elements or steps. It should be considered as the presence provided of these features, integers, steps or components as required, but does not preclude the presence or addition of one or more other features, integers, steps or components, or groups thereof. Thus, the volume of "an article comprising means A and B" may not be limited to an object which is composed solely of agents A and B. It means that A and B are the only elements of interest to the subject matter in connection with the present invention. In accordance with this, the terms "comprise" or "embed" enclose also the more restrictive terms "consisting essentially of" and "consist of". By replacing "comprise" or "include" with "consist of" these terms therefore represent the basis of preferred but narrowed embodiments, which are also provided as part of the content of this document with regard to the present invention.

Unless specified otherwise, all ranges provided herein include up to and including the endpoints given, and the values of the constituents or components of the compositions are expressed in weight percent or % by weight of each ingredient in the composition.

As used herein, "weight percent," "wt-%," "percent by weight," "% by weight", "ppm wt", "ppm by weight", "weight ppm" or "ppm" and variations thereof refer to the concentration of a substance as the weight of that substance divided by the total weight of the composition and multiplied by 100 or 1000000 as appropriate, unless specified differently. It is understood that, as used here, "percent," "%," are intended to be synonymous with "weight percent," "wt-%," etc.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

Additionally, each compound used herein may be discussed interchangeably with respect to its chemical formula, chemical name, abbreviation, etc.

Metals and compounds at most as noble as iron or zinc are compounds that under the furnace conditions have at least the same or even a higher affinity for oxygen than iron or zinc, and therefore also than copper, nickel, tin and lead. This definition refers to "iron or zinc", because the relative position of zinc and iron with respect to their affinity for oxygen under the furnace conditions is very close and may even change depending on the furnace conditions. In order to be correct and comprehensive in this definition, it is therefore necessary to refer to both these metals. Under the furnace conditions, these selected metals or compounds quite readily engage on the oxidizing side of the redox reactions as part of the present invention. Suitable metals are for instance elemental zinc and iron themselves, aluminium, silicon and calcium. Suitable compounds may for instance be metal silicides, preferably silicides of metals that are as such already suitable, such as iron silicide (FeSi), but also bimetallic or multimetallic compounds may be suitable, including mixtures, such as SnAl, CuFe, FeSn, or alloys, such as messing (ZnCu). Further suitable compounds may be metal sulphides, such as FeS, ZnS and/or sulphides of other metals of which the sulphides or the metals are at most as noble as iron or zinc.

Metals and compounds more noble than copper are compounds that under the furnace conditions have a lower affinity for oxygen than copper. These raw materials quite readily engage on the reducing side of the redox reactions as part of the present invention and result in the liberation of the corresponding metal in its elemental form. Suitable are for instance silver, gold, other precious metals, including platinum group metals, alloys and mixtures thereof, including those comprising other metals.

In the context of the present invention is meant with the terms "smelter", "to smelt", "smelting" or similar deviations from "smelting", a process that comprises much more than only the change in the state of matter of a compound from solid to liquid. In a pyrometallurgical smelter step are occurring several chemical processes which convert particular chemical compounds into other chemical compounds. Important ones of such conversions may be oxidations, possibly coupled with the formation of an oxide, or reductions, by which the oxidation state of some of the atoms are changing. Throughout this document the terms "smelter", "smelter furnace", and "smelting furnace" are used interchangeably and all mean the furnace in which this process step is taking place.

In the context of the present invention, with the terms "dross" or "drosses" are meant a substance which is often paste-like that is formed as a consequence of an operational step, and which separates from a different liquid phase, typically under the influence of gravity, and usually comes floating on top. The dross or drosses may typically be scraped off or removable from the liquid underneath.

With the terms "solder" is in the context of the present invention meant a metal composition which is rich in tin and/or lead, but which may also contain other metals. Solder is characterised by a relatively low melting temperature, which makes the composition suitable, after having been heated to a relatively limited temperature, upon cooling able to form a metal connection between two other metal parts, the so-called "soldering".

In this document and unless specified differently, amounts of metals and oxides are expressed in accordance with the typical practice in pyrometallurgy. The presence of each metal is typically expressed in its total presence, regardless whether the metal is present in its elemental form (oxidation state=0) or in any chemically bound form, typically in an oxidized form (oxidation state>0). For the metals which may relatively easily be reduced to their elemental forms, and which may occur as molten metal in the pyrometallurgical process, it is fairly common to express their presence in terms of their elemental metal form, even when the composition of a slag is given, wherein the majority of such metals may actually be present in an oxidized form. It is therefore that the composition of a slag such as the slag obtained in the process according to the present invention specifies the content of Fe, Zn, Pb, Cu, Sb, Bi as elemental metals. Less noble metals are more difficult to reduce under non-ferrous pyrometallurgical conditions and occur mostly in an oxidized form. These metals typically are expressed in terms of their most common oxide form. Therefore slag compositions are typically giving the content of Si, Ca, Al, Na respectively expressed as $SiO_2$, CaO, $Al_2O_3$, $Na_2O$.

A metallurgical slag is typically not a pure substance, but a mixture of many different components. Consequently a metallurgical slag does not have a clear melting temperature. In the art it has become common to use the term "liquidus temperature", which is the temperature at which the slag is fully liquid.

In an embodiment of the process according to the present invention the feedstock further comprises at least one second metal selected from the group consisting of nickel, tin and lead. Raw materials comprising at least one second metal selected from this list are of high interest for the recovery of copper therefrom, but the presence of the second metal may pose extra burdens or difficulties, as compared with raw materials that do not comprise the second metal. The applicants have found that the smelting step is a highly suitable process step for introducing raw material comprising at least one of such second metal. The applicants have found that this at least one second metal may also be present in the feedstock as its oxide or in another form that is able to participate in redox reactions under the furnace conditions and liberate the metal in its elemental form. The applicants prefer in this context the oxide form, because of its higher availability at advantageous conditions, because of the reaction heat that is generated by the redox reactions to which it participates, as well as because of its contribution of oxygen into the furnace, which reduces the amount of oxygen that needs to be injected. The reduction of the oxygen injection need also reduces the gas flow through the smelting step, which is beneficial because the reaction rate is not limited by the rate of the external supply of oxygen gas, but rather only limited by the reaction kinetics. Less gas input may also mean less furnace exhaust gasses that need treatment, and also less solid entrainment therein.

In an embodiment of the process according to the present invention wherein the feedstock comprises the at least one second metal, the concentrated copper intermediate further comprises the at least one second metal. The applicants have found that the smelting step may be operated such that also most of the second metal is retrieved as part of the concentrated copper intermediate, most readily by a.o. driving the redox reactions in the smelting furnace to the appropriate degree. The applicants have found that this feature brings the advantage that also the at least one second metal may further downstream be recovered as part of a prime product of desirably high quality.

In an embodiment of the process according to the present invention the feedstock comprises scrap iron, silicon, zinc and/or aluminium, more preferably scrap iron. The applicants have found that this scrap material may readily be dosed sufficiently accurately by mixing appropriate amounts with the other raw materials as part of the feed batch. The applicants may also add this scrap material as an extra raw material stream into the furnace. The applicants have found that scrap materials such as scrap iron and aluminium, but to some degree also scrap silicon, may quite readily be obtained in suitable quantities and at economically advantageous conditions. The applicants also found that a separate addition of the scrap material as an extra raw material feed stream to the furnace, preferably scrap iron, offers the advantage of highly conveniently being able to control and maintain the excess of the elemental form of iron and/or of metals and/or compounds that are under the furnace conditions at most as noble as iron or zinc.

In an embodiment of the process according to the present invention, the process further comprises the step of removing the smelting slag at least partially from the furnace. The applicants prefer to remove at least a part of the smelting slag from the furnace before starting the subsequent feed batch. If the feedstock that is available at the time of the new feed batch comprises a significant fine portion, the applicants prefer to maintain a layer of slag in the furnace, because this layer provides a suitable blanket underneath which the fine portion of the feedstock, or the feedstock comprising the significant fine portion, may be introduced without creating excessive risk that fine feedstock particles become entrained by the furnace exhaust gases and form an extra burden and/or nuisance for the furnace exhaust gas treatment system. If the available feedstock comprises a significant coarse portion, the applicants prefer to remove substantially all of the formed slag from the furnace before starting the subsequent feed batch. This brings the advantage that more furnace volume may be made available for the subsequent feed batch, and is thus beneficial for the throughput and/or productivity of the smelting furnace. The applicants have found that the step of removing slag from the furnace may be performed several times during the same furnace feed batch.

In an embodiment of the process according to the present invention, the process comprises the step of removing at least a portion of the concentrated copper intermediate from the furnace, preferably at most a portion. The applicants prefer to assure a suitable physical presence of molten metal in the furnace when starting a subsequent feed batch or a campaign comprising a series of feed batches. This molten metal is then readily available as a hot liquid already at the start of the new feed batch or entire campaign for accepting and wetting the solid feedstock and possibly also extra amounts of the elemental form of iron and of metals or compounds that are under the furnace conditions at most as noble as iron or zinc, which may be desired or necessary for readily creating and/or maintaining the excess of these additives for the process in accordance with the present invention. The iron dissolved in this molten metal is readily available for reacting with oxygen that is injected into the liquid bath, and hence for immediately generating reaction heat. A further advantage is that solid iron that may be added into the furnace at the start of the new feed batch remains floating on the molten metal phase, the exact location where it is able to fully contribute to the redox reactions that are intended in the process. The applicants have found that retaining a portion of the concentrated copper intermediate in the furnace when starting a new furnace feed batch significantly reduces the time before the furnace may again operate at high capacity as part of that next feed batch, and hence brings a significant improvement in the productivity of the smelting step. The applicants prefer to remove a portion of the molten metal formed during the previous feed batch before starting a new furnace feed batch. The applicants have found that the step of removing a portion of the concentrated copper intermediate from the furnace may even be performed several times during the same furnace feed batch.

The applicants prefer to operate the smelting step as much as possible in an almost semi-continuous mode, wherein suitable material may continue to be added to the furnace until the useable furnace volume is in full use. When the slag and metal phases then have reached the desired quality, first at least a major portion of the slag may be removed from the furnace, e.g. via an overflow through the feed port made possible by tilting the furnace, and subsequently a significant portion of the liquid molten metal phase may also be removed, in the same manner if all slag was removed, or be tapped via a "bottom tap" hole suitably located in the furnace wall. A suitable portion of the molten metal is preferably kept in the furnace when the introduction of the next feed batch into the smelting furnace is started, for the reasons explained above. The applicants have found that this operation may be continued over a very long period of time, and may only have to be discontinued or halted for external reasons or when a maintenance intervention to the smelting furnace is deemed necessary. The applicants have found that this operation may be further improved by preparing suitable pre-mixed batches of feed material in terms of composition and size of the solids in the batch. The applicants have found that this may bring the advantage of a much more stable operation in terms of the timing in the sequence of steps as well as in the quality of the concentrated copper intermediate that is each time removed from the furnace as the main product.

In an embodiment of the process according to the present invention, the iron and compounds at most as noble as iron or zinc that are introduced with the feedstock comprise solid iron, solid silicon, solid zinc and/or solid aluminium, preferably comprising copper/iron containing scrap, silicon containing scrap, zinc containing scrap and/or aluminium containing scrap. The applicants have found that these sources of iron, silicon, zinc and aluminium are readily available from various sources. In addition, they may comprise small amounts of other metals that may be recoverable and worth recovering in their elemental form in and downstream of the smelting step. Such other metals may include tin, lead and nickel. They may also include traces of more noble and even precious metals (PMs) such as silver or gold, and even platinum group metals (PGMs) such as ruthenium, rhodium, osmium, palladium, iridium and platinum itself, of which very small amounts may be worth recovering because of their scarcity and high economic value.

In an embodiment of the process according to the present invention, the feedstock is at least partly solid and whereby the solid feedstock is fed gradually, preferably continuously, to the furnace, preferably during most of the smelting feed batch and more preferably during most of an entire smelting campaign, preferably by means of at least one conveyer belt and/or shaking conveyer. As explained elsewhere in this document, the applicants prefer to feed in the early stage of a furnace feed batch and/or campaign parts of the coarse portion of the available feedstock, and this until a conveniently thick layer of metallurgical slag has formed as a blanket on the molten metal phase in the furnace. If this layer of slag is made available from the start of the feed batch, or once it has been formed by running the furnace on the coarse portion of the available feedstock, the applicants prefer to also introduce into the furnace amounts of the fine portion of the available feedstock, and the applicants prefer to introduce this fine portion pneumatically via a lance that is submerged into the liquid bath and releases the fine portion material about at the interface between the molten metal phase and the supernatant molten slag phase because this brings the advantage of a low risk for loosing fine feedstock particles with the furnace exhaust gases.

In an embodiment of the process according to the present invention, the input rate of the feedstock is kept below the rate at which the heat generation would become insufficient for melting the solid feedstock and/or bringing the feedstock up to the desired furnace temperature. The applicants prefer to avoid as much as possible the risk that the enthalpy balance of the furnace becomes deficient because the heat generation would be insufficient for heating and melting the feedstock that is being introduced, in which case the temperature in the furnace risks to fall. The applicants have found that it is advantageous to control the input rate of the feedstock and e.g. iron may be added at a sufficient rate such that the excess of the elemental form of iron and of metals and compounds that are under the furnace conditions at most as noble as iron or zinc remains sufficiently high, combined with sufficient input of oxygen, are able to generate sufficient reaction heat to achieve a ready heating and melting of the feedstock that is being introduced.

In an embodiment of the process according to the present invention, at least a portion of the feedstock is in the form of a finely divided portion, and the finely divided feedstock portion is having an average particle size of at most 10 mm, preferably the finely divided feedstock portion material having an average particle size of at most 3.36 mm. The applicants have found that finely divided raw materials comprising copper and other metals of interest for the process according to the present invention are usually difficult to process in alternative processes, and therefore may be found in significant amounts and at economically attractive conditions. The applicants have found that such materials may readily be processed flawlessly in the process according to the present invention. The applicants prefer to introduce such finely divided feedstock portions into the furnace only once a continuous layer of molten slag has become available in the furnace, floating on top of the molten metal phase underneath. The applicants prefer to introduce the finely divided feedstock portion about at the interface between molten metal and molten slag, such that the slag layer may act as a blanket which is able to trap any of the small particles before these are able to reach the furnace gas phase and risk to be entrained with the exhaust gases and not participate in the process inside the furnace.

In an embodiment of the process according to the present invention wherein the feed comprises the finely divided feedstock portion, the finely divided feedstock portion material is transported pneumatically and injected into the furnace. The applicants have found that this is a highly convenient method for introducing such a finely divided feedstock portion, and this method offers the possibility to introduce the portion at the most advantageous location, i.e. closely above the interface between liquid metal and liquid slag, where also any elemental iron such as iron scrap that is present is usually floating and where most of the chemical reactions are taking place.

In an embodiment of the process according to the present invention wherein the feed comprises the finely divided feedstock portion, the finely divided feedstock portion material is injected into the liquid slag phase and above the metal phase of the liquid bath. The applicants have found that the slag phase closely above the interface between liquid metal and liquid slag, where also any elemental iron such as iron scrap that is present is usually floating. It is the location where most of the chemical reactions are taking place and where also most of the reaction heat is being generated.

In an embodiment of the process according to the present invention wherein the feed comprises the finely divided feedstock portion, the average composition of the finely divided feedstock portion that is fed over the entire smelting feed batch in the furnace complies with at least one and preferably with all of the following conditions, after heating to 1150° C.:

comprising at least 5% wt of total metal, preferably at least 5% of the total of copper, nickel, tin, lead and zinc, preferably at least 6% wt, more preferably at least 7% wt, even more preferably at least 8% wt, preferably at least 9% wt, more preferably at least 10% wt of total metal, preferably of the total of copper, nickel, tin, lead and zinc, comprising at most 70.0% wt of copper (Cu), preferably at most 65.0% wt, more preferably at most 60.0% wt, even more preferably at most 55.0% wt, yet more preferably at most 50.0% wt, preferably at most 48.0% wt of copper, and optionally at least 10% wt of copper, preferably at least 15% wt, more preferably at least 20% wt, even more preferably at least 25% wt, yet more preferably at least 30% wt, preferably at least 35% wt, more preferably at least 40% wt and even more preferably at least 42.0% wt of copper, comprising at most 2.00% wt of nickel (Ni), preferably at most 1.50% wt, more preferably at most 1.00% wt of nickel, comprising at least 0.50% wt and at most 10.00% wt of lead (Pb), preferably at least 1.00% wt, more preferably at least 1.50% wt, and optionally at most 9.00% wt, preferably at most 8.00% wt of lead, comprising at most 15.00% wt of tin (Sn), preferably at most 14.00% wt, more preferably at most 13.00% wt, even more preferably at most 12.00% wt of tin, comprising at most 2.00% wt of antimony (Sb), preferably at most 1.50% wt, more preferably at most 1.00% wt of antimony, comprising at most 7.0% wt of iron (Fe), preferably at most 6.0% wt, more preferably at most 5.0% wt, even more preferably at most 4.0% wt, yet more preferably at most 3.50% wt of iron, and comprising at most 55% wt of zinc (Zn), preferably at most 50% wt, more preferably at most 45% wt, even more preferably at most 43% wt, even more preferably at most 40% wt, yet more preferably at most 35.0% wt of zinc.

The applicants have found that the finely divided feedstock portion as specified is highly suitable for the process according to the present invention, because of the presence of metals that are of interest for being recovered in high quality products downstream of the process and/or because of the presence of metals that may bring reaction heat as part of the process according to the present invention, while the finely divided feedstock portion is at the same time sufficiently low in the contents of these metals such that the portion is of insufficient economic interest for alternative processes for the recovery of metals from primary and/or secondary raw materials, and hence the feedstock may be found at economically attractive conditions which offer a significant upgrade when processed in the process according to the present invention. Compliance with the upper limit for sulphur content as part of one of the conditions in the above list further avoids the formation of a separate copper matte phase, and thus clearly differentiates the process according to the present invention including this feature from copper smelting processes in which a matte phase is formed as one of the products or intermediates.

In an embodiment of the process according to the present invention, the feedstock comprises at least one return material from the processing of the molten liquid metal phase and/or of the liquid slag phase formed by the process. The applicants have found that the smelting step is a highly convenient step for returning by-products that may be formed by the further processing of the molten liquid metal phase and/or of the liquid slag phase formed in the smelting step. Such further processing may occur after the smelting step in the same furnace but preferably downstream of the smelting step and in different equipment. Examples of such downstream processing are explained further below in this document.

In an embodiment of the process according to the present invention wherein the feedstock comprises at least one return material, the at least one return material comprises at least one material selected from reject anodes or other products comprising copper, tin and/or lead, a metal oxide or sulphide, preferably of copper, nickel, tin, lead and/or zinc, including dross containing the metal as oxide or sulphide formed and removed from a downstream treatment step, a metal silicide, preferably a silicide of a metal selected from copper, zinc, nickel, iron, lead and tin, and a crust or other solid that is formed against the wall of a crucible or a ladle that was used for transferring a molten metal and/or a molten slag that has been removed from a furnace. The applicants have found that the smelting step is a highly suitable process location for returning by-products that may be rather ill-defined in terms of their content, such as some of the materials in the above list, or of by-products that may contain a variety of metals of interest, such as zinc oxide dust that may be collected by filtering the exhaust gases of furnaces performing a wide variety of pyrometallurgical process steps, or of furnace slags that contain recoverable metals at levels that would burden or preclude their more typical outlet and/or that would justify an extra pass through the overall metal recovery process.

In an embodiment of the process according to the present invention, the feedstock is introduced centrally into the liquid bath in the furnace. This brings the advantage that the solid feedstock, thanks to its buoyancy it experiences when submerged in the molten metal phase, usually is able to come floating on top of the molten metal phase without coming into contact with the refractory lining in the furnace. This reduces the wear and tear that the solid feedstock may bring to the refractory lining, and hence improves the life of the refractory lining and hence the time between two maintenance interventions for repairing the refractory lining.

In an embodiment of the process according to the present invention, the feedstock comprises a coarse portion, the coarse feedstock portion preferably having an average particle size of at least 5 mm, preferably at least 10 mm, even more preferably at least 15 mm and the average composition of the coarse feedstock portion that is fed over the entire smelting feed batch in the furnace complies with at least one and preferably all of the following conditions, after heating to 1150° C.:

comprising at least 20% wt of total metal, preferably at least 20% of the total of copper, nickel, tin, lead and zinc together, preferably at least 30% wt, more preferably at least 40% wt, even more preferably at least 50% wt, preferably at least 60% wt, more preferably at least 70% wt and optionally at most 95% wt of total metal, preferably of the total of copper, nickel, tin, lead and zinc, comprising at least 10.0% wt and at most 70.0% wt of copper (Cu), preferably at least 15.0% wt, more preferably at least 17.0% wt, even more preferably at least 18.0% wt, yet more preferably at least 19.0% wt, and optionally at most 65.0% wt, preferably at most 60.0% wt, more preferably at most 55.0% wt, even more preferably at most 50.0% wt and yet more preferably at most 45.0% wt of copper, comprising at least 0.50% wt and at most 2.00% wt of nickel (Ni), preferably at least 0.60% wt, more preferably at least 0.70% wt, even more preferably at least 0.80% wt, yet more preferably at least 0.90% wt, and optionally at most 1.90% wt, preferably at most 1.80% wt, more preferably at most 1.70% wt, even more preferably at most 1.60% wt and yet more preferably at most 1.50% wt of nickel, comprising at least 1.00% wt and at most 8.00% wt of lead (Pb), preferably at least 1.10% wt, more preferably at least 1.25% wt, even more preferably at least 1.50% wt, yet more preferably at least 1.60% wt, and optionally at most 7.50% wt, preferably at most 7.00% wt, more preferably at most 6.50% wt, even more preferably at most 6.00% wt and yet more preferably at most 5.50% wt of lead, comprising at least 0.50% wt and at most 2.50% wt of tin (Sn), preferably at least 0.60% wt, more preferably at least 0.70% wt, even more preferably at least 1.00% wt, yet more preferably at least 1.20% wt, and optionally at most 2.40% wt, preferably at most 2.30% wt, more preferably at most 2.20% wt, even more preferably at most 2.00% wt and yet more preferably at most 1.90% wt of tin, comprising at most 0.10% wt of antimony (Sb), preferably at most 0.08% wt, more preferably at most 0.06% wt of antimony, comprising at least 10.0% wt and at most 35.00% wt of iron (Fe), preferably at least 11.0% wt, more preferably at least 12.0% wt, even more preferably at least 13.0% wt, yet more preferably at least 14.0% wt, and optionally at most 34.5% wt, preferably at most 34.0% wt, more preferably at most 33.0% wt, even more preferably at most 32.0% wt and yet more preferably at most 31.0% wt of iron, and comprising at least 2.00% wt and at most 15.00% wt of zinc (Zn), preferably at least 2.50% wt, more preferably at least 3.00% wt, even more preferably at least 3.50% wt, yet more preferably at least 4.00% wt, and optionally at most 14.00% wt, preferably at most 12.00% wt, more preferably at most 11.00% wt, even more preferably at most 10.00% wt and yet more preferably at most 9.00% wt of zinc.

The applicants have found that the coarse feedstock portion is highly suitable as feedstock for the process according to the present invention. The portion comprises sufficient amounts of the metals of interest to make the portion as a whole of interest, but the levels of valuable metals are not sufficiently high to make the coarse portion of interest for alternative processes for the recovery of some of these metals. The applicants have found that the coarse portion as specified is insufficiently rich in copper and/or tin plus lead in order to make the portion a suitable feedstock for the pyrometallurgical refining of copper, such as is for instance described in WO 2019/115533 A1. Compliance with the upper limit for sulphur content as part of one of the conditions in the above list further contributes in avoiding the formation of a separate copper matte phase, and thus clearly differentiates the process according to the present invention including this feature from copper smelting processes in which a matte phase is formed as one of the products or intermediates.

The applicants have further found that relatively low levels of sulphur may readily be accepted in the coarse portion of the feedstock. This brings the advantage that a wider choice of raw materials may be accepted in the smelting step, including raw materials that would not be acceptable or would be less desirable in alternative processes for processing such raw materials.

In an embodiment of the process according to the present invention, the level of iron and/or metals and compounds at most as noble as iron or zinc dissolved in the molten metal inside the furnace is maintained at least at 1.0% wt, preferably at least at 1.5% wt, whereby the concentration of the metals and compounds at most as noble as iron or zinc is converted to an equivalent iron concentration, whereby the equivalent iron concentration is the iron concentration that is able to contribute the same amount of reaction heat as the metal or compound at most as noble as iron or zinc when reacting with oxygen under the furnace conditions. The applicants have found that the compliance with this condition is very conveniently monitored and maintained, and readily assures a sufficient excess of the elemental form of iron and of metals or compounds that are under the furnace conditions at most as noble as iron or zinc. The compliance with this condition also assures that there is always sufficient excess present in the furnace of the iron and/or other metals or compounds at most as noble as iron or zinc, such that with sufficient oxygen injection, the temperature inside the furnace may readily be maintained. A further advantage is that this condition assures the tuyere protection by solid iron and/or iron oxide that is described elsewhere in this document.

In an embodiment of the process according to the present invention, the level of iron and/or metals and compounds that are under the furnace conditions at most as noble as iron or zinc dissolved in the molten metal inside the furnace is maintained at most at 10.0% wt, preferably at most 9.0% wt, more preferably at most 8.0% wt, even more preferably at most 7.0% wt, yet more preferably at most 6.0% wt, preferably at most 5.0% wt, more preferably at most 4.0% wt, even more preferably at most 3.5% wt, yet more preferably at most 3.0% wt, preferably at most at 2.5% wt, whereby the concentration of the metals and compounds at most as noble as iron or zinc is converted to an equivalent iron concentration, whereby the equivalent iron concentration is the iron concentration that is able to contribute the same amount of reaction heat as the metal or compound at most as noble as iron or zinc when reacting with oxygen under the furnace conditions. Compliance with this condition reduces the risks that iron would come out of solution at the colder spots in the furnace, such as against the furnace walls, where it may reduce the available furnace volume and impair the agitation of the liquid bath inside the furnace.

In an embodiment of the process according to the present invention, elemental iron is introduced into the smelting step at a rate by which an excess of iron, above its solubility into the metal bath at the furnace conditions, is maintained in the melting bath during the process. The applicants have found that this is a highly convenient means for providing sufficient iron in the furnace to assure the desired excess thereof.

In an embodiment of the process according to the present invention, the amount of excess iron present in the furnace is maintained by at least periodically sampling the molten metal phase in the furnace and analysing the sample for iron. Preferably the amount of excess iron is kept limited in order to keep the amount of solid iron parts moving around in the liquid bath of the furnace limited in order to limit the possible damage, wear and tear these swimming parts may bring to the refractory lining in the furnace.

In an embodiment of the process according to the present invention, the combustible source of carbon and/or hydrogen is selected from the group consisting of coke, charcoal, carbon black, a hydrocarbon, natural gas, methane, ethane, propane, butane, a hydrocarbon that is liquid at standard conditions, a hydrocarbon containing polymer, a plastic, a waste plastic, grease, oil, paint, varnish, rubber, preferably a waste thereof, and combinations thereof. The applicants have found that a wide range of sources are suitable, and some of these sources are quite readily available at attractive supply conditions.

In an embodiment of the process according to the present invention, the amount of combustible source of carbon and/or hydrogen is kept below the level at which slag foaming would impair the operation of the smelting step, preferably significantly below this level such that also the risk for slag foaming remains acceptably low. The applicants have found that the upper acceptable level depends on the selected source, but may readily be determined by trial and error. A further advantage of complying with this precaution is that the temperature of the furnace off-gas remains acceptable, as well as the carbon monoxide content of that off-gas. Alternatively, the amount of combustible source of carbon and/or hydrogen is kept limited below the level at which the temperature of the furnace off-gas remains acceptably low, or below the level at which the carbon monoxide content of that off-gas remains acceptably low.

In an embodiment of the process according to the present invention, at least a part of the oxygen containing gas is introduced into the supernatant slag phase, preferably as close as practically possible to the interface between the metal phase and the supernatant slag phase. The applicants prefer to introduce at least a part of the oxygen containing gas in this target location where the oxygen is most readily consumed by oxidizing elemental metals, such as iron, dissolved in the metal phase, and from which the oxide formed by the oxidation reaction may readily move into the supernatant slag phase with a minimum diffusion distance to cover.

In an embodiment of the process according to the present invention, at least part of the oxygen containing gas is introduced by means of at least one metal lance of which the tip is submerged into the liquid slag phase. The applicants have found that this is a highly convenient method for introducing the oxygen containing gas at its target location. The lance may be introduced via a dedicated opening in the furnace wall, or may be introduced through the filling mouth of the furnace via which also feedstock may be introduced.

In an embodiment of the process according to the present invention using the at least one metal lance, the gas injected through the metal lance comprises at least 30% vol oxygen, preferably at least 40% vol, more preferably at least 50% vol, yet more preferably at least 75% vol, and even more preferably the gas is high purity oxygen. This brings the advantage, in comparison with using air as the oxygen containing gas, of reducing and preferably avoiding the generation of extra furnace exhaust gases. The exhaust gas treatment system may therefore be made smaller or it may be operated more effectively. A further advantage is that the furnace exhaust gases contain less nitrogen oxides, and hence are environmentally more acceptable.

In an embodiment of the process according to the present invention using the at least one metal lance, the gas flow through the metal lance is providing sufficient cooling to avoid that the lance would corrode and/or melt under the conditions of being submerged into the liquid bath of molten slag. The applicants prefer to introduce the gas lance into the furnace from above the liquid bath, and to submerge the lance only into the supernatant slag phase but not as far as into the molten metal bath. The applicants have observed that the lance, thanks to the sufficient cooling effect of the gas that is passing through it, as prescribed, may sustain a prolonged exposure to the hot slag phase, but would rather rapidly dissolve in the underlying molten metal phase.

In an embodiment of the process according to the present invention, at least a part of the oxygen containing gas is introduced in the bottom of the furnace through at least one tuyere, preferably a plurality of tuyeres, more preferably the tuyeres of the plurality being equally distributed over the bottom of the furnace. This brings the advantage of high agitation of the liquid bath in the furnace.

In an embodiment of the process according to the present invention using the tuyere, the gas introduced through the at least one tuyere is an oxygen containing gas comprising at most 50% vol oxygen, preferably at most 40% vol, more preferably at most 30% vol, even more preferably at most 25% vol, yet more preferably the gas introduced by the tuyere is air. The gas needs to overcome the hydrostatic pressure imposed by the height of liquid furnace content. The gas therefore needs to be compressed in order to enable the introduction via the tuyere. If the gas comprises air, this air is therefore compressed before its introduction.

In an embodiment of the process according to the present invention using the tuyere, the gas introduced through the at least one tuyere is cooler than the molten liquid metal phase surrounding the tuyere. The molten liquid metal phase around the tuyere is thereby cooled and its solubility for iron is thereby reduced, and when the molten liquid metal phase is saturated with iron at the higher temperature, results in iron and/or iron-containing compounds, such as iron oxides, precipitating and forming a deposit around the tuyeres, typically in the form of a hollow mushroom, which provides a welcome protection of the tuyeres against corrosion caused by the high heat of oxidation of iron close to the tuyeres.

In an embodiment of the process according to the present invention, the smelting slag produced by the process comprises at least 20% wt of iron (Fe), preferably at least 22.5% wt, more preferably at least 25.0% wt, even more preferably at least 27.50% wt, yet more preferably at least 30.00% wt of iron. In this context is the iron content the sum of iron presence in all its valence states, hence the sum of all iron present as elemental iron and the iron present in a chemically bound form, usually in the form of an oxide. This brings the advantage of a higher slag fluidity, i.e. a lower viscosity at the same temperature.

In an embodiment of the process according to the present invention, the composition of the smelting slag produced complies with at least one and preferably with all of the following conditions:
  comprising at most 1.00% wt of copper (Cu), preferably at most 0.90% wt, more preferably at most 0.80% wt, even more preferably at most 0.70% wt, yet more preferably at most 0.60% wt of copper,
  comprising at most 0.20% wt of nickel (Ni), preferably at most 0.17% wt, more preferably at most 0.15% wt, even more preferably at most 0.12% wt and yet more preferably at most 0.10% wt of nickel,
  comprising at most 2.00% wt of lead (Pb), preferably at most 1.50% wt, more preferably at most 1.00% wt, even more preferably at most 0.95% wt and yet more preferably at most 0.90% wt of lead,
  comprising at most 1.00% wt of tin (Sn), preferably at most 0.80% wt, more preferably at most 0.60% wt, even more preferably at most 0.40% wt and yet more preferably at most 0.25% wt of tin,
  comprising at most 22.50% wt of zinc (Zn), preferably at most 20.00% wt, more preferably at most 17.50% wt, even more preferably at most 15.00% wt and yet more preferably at most 12.50% wt of zinc.

The compliance with the upper limits as specified for copper, nickel, tin and lead brings the advantage of a low rejection of valuable metals from the process. The invention being directed to a process for the recovery of copper, the limitation on copper loss in the smelting slag brings the advantage of a high copper recovery from the available raw materials.

The applicants have found that many copper containing raw materials, in particular the secondary materials in that group, contain also significant amounts primarily of tin, but possibly also of lead, nickel and zinc. The applicants have found that most of these metals other than copper may be recovered from the same raw materials by pyrometallurgical process steps, provided that these metals are not allowed to slip away in the smelting slag. The compliance with the upper limits for the other metals, primarily for tin and nickel but also for lead and to some extent also zinc, bring the advantage of a high recovery of these metals from the available raw materials.

The presence of zinc in the smelting slag may be allowed to be higher in case an extra slag fuming step is provided in which the smelting slag is fumed to reduce its zinc content, optionally also its lead content. The applicants prefer to add such an extra fuming step for removing more zinc from the smelting slag, preferably also further traces of lead, preferably as described in WO 2016/156394 A1.

The applicants have found that the above features of low losses of valuable metals in the smelting slag may be controlled and obtained by a suitable operation of the smelting step with respect to the furnace temperature, the furnace agitation, and the addition of oxygen, of reducing agents and the selection thereof, and of flux materials (or slag formers as they may also be called) and the selection thereof.

In an embodiment of the process according to the present invention, the composition of concentrated copper intermediate as the prime product from the smelting step complies with at least one and preferably all of the following conditions:

comprising at least 50.0% wt of copper (Cu), preferably at least 55.0% wt, more preferably at least 60.0% wt, even more preferably at least 65.0% wt, yet more preferably at least 70.0% wt, preferably at least 72.5% wt, more preferably at least 75.0% wt, even more preferably at least 77.0% wt, yet preferably at least 78.0% wt or even 79.0% wt of copper (Cu), and optionally at most 97.0% wt, preferably at most 95.0% wt, more preferably at most 90.0% wt, even more preferably at most 85% wt, yet more preferably at most 82.0% wt, preferably at most 80% wt, more preferably at most 79.0% wt, even more preferably at most 78.0% wt, yet preferably at most 77.0% wt of copper (Cu), comprising at least 0.01% wt of nickel (Ni), preferably at least 0.05% wt, more preferably at least 0.10% wt, even more preferably at least 0.50% wt, yet more preferably at least 1.00% wt, preferably at least 1.10% wt, more preferably at least 1.25% wt, even more preferably at least 1.40% wt, yet preferably at least 1.50% wt or even 1.70% wt of nickel (Ni), and optionally at most 15.00% wt, preferably at most 12.50% wt, more preferably at most 10.00% wt, even more preferably at most 7.50% wt, yet more preferably at most 5.00% wt, preferably at most 4.00% wt, more preferably at most 3.00% wt, even more preferably at most 2.50% wt, yet preferably at most 2.40% wt of nickel (Ni), comprising at least 0.10% wt of lead (Pb), preferably at least 0.50% wt, more preferably at least 1.00% wt, even more preferably at least 2.00% wt, yet more preferably at least 3.00% wt, preferably at least 3.50% wt, more preferably at least 4.00% wt, even more preferably at least 4.50% wt, yet preferably at least 5.00% wt or even 5.50% wt of lead, and optionally at most 15.00% wt, preferably at most 14.50% wt, more preferably at most 14.00% wt, even more preferably at most 13.50% wt, yet more preferably at most 13.00% wt, preferably at most 12.50% wt, more preferably at most 12.00% wt, even more preferably at most 11.50% wt, yet preferably at most 11.00% wt, preferably at most 10.50% wt, more preferably at most 10.00% wt, even more preferably at most 9.50% wt, yet preferably at most 9.00% wt of lead (Pb), comprising at least 1.00% wt of tin (Sn), preferably at least 1.25% wt, more preferably at least 1.50% wt, even more preferably at least 1.75% wt, yet more preferably at least 2.00% wt, preferably at least 2.25% wt, more preferably at least 2.50% wt, even more preferably at least 2.75% wt, yet preferably at least 3.00% wt or even 3.25% wt of tin (Sn), and optionally at most 12.00% wt, preferably at most 10.00% wt, more preferably at most 8.00% wt, even more preferably at most 7.00% wt, yet more preferably at most 6.00% wt, preferably at most 5.50% wt, more preferably at most 5.00% wt, even more preferably at most 4.50% wt, yet preferably at most 4.00% wt of tin (Sn), comprising at least 0.05% wt of iron (Fe), preferably at least 0.10% wt, more preferably at least 0.30% wt, even more preferably at least 0.50% wt, yet more preferably at least 0.60% wt, preferably at least 0.70% wt, more preferably at least 0.80% wt, even more preferably at least 0.90% wt, yet preferably at least 1.00% wt or even 1.10% wt of iron (Fe), and optionally at most 5.00% wt, preferably at most 4.00% wt, more preferably at most 3.00% wt, even more preferably at most 2.50% wt, yet more preferably at most 2.00% wt, preferably at most 1.75% wt, more preferably at most 1.50% wt, even more preferably at most 1.25% wt, yet preferably at most 1.00% wt of iron (Fe), comprising at least 0.10% wt of zinc (Zn), preferably at least 0.50% wt, more preferably at least 1.00% wt, even more preferably at least 2.00% wt, yet more preferably at least 2.50% wt, preferably at least 3.00% wt, more preferably at least 3.50% wt, even more preferably at least 4.00% wt, of zinc (Zn), and optionally at most 10.00% wt, preferably at most 9.50% wt, more preferably at most 9.00% wt, even more preferably at most 8.50% wt, yet more preferably at most 8.00% wt, preferably at most 7.50% wt, more preferably at most 7.00% wt, even more preferably at most 6.50% wt, yet preferably at most 6.00% wt, preferably at most 5.50% wt, more preferably at most 5.00% wt of zinc (Zn), comprising at most 5% wt of sulphur (S), preferably at most 4.5% wt, more preferably at most 4.0% wt, even more preferably at most 3.5% wt, yet more preferably at most 3.0% wt, preferably at most 2.5% wt, more preferably at most 2.0% wt, preferably at most 1.5% wt, more preferably at most 1.0% wt, even more preferably at most 0.5% wt, yet more preferably at most 0.1% wt of sulphur, and optionally at least 5 ppm by weight, preferably at least 50 ppm by weight, more preferably at least 100 ppm by weight, even more preferably at least 500 ppm by weight, yet more preferably at least 1000 ppm by weight, preferably at least 0.5% wt, more preferably at least 1.0% wt of sulphur.

The applicants have found that the above features of the invention may also be controlled and obtained by an appropriate operation of the smelting step, as described above, including the selection of the feed materials. Compliance with the upper limit for sulphur content as part of one of the conditions in the above list further avoids the formation of a separate copper matte phase, and thus clearly differentiates the process according to the present invention including this feature from copper smelting processes in which a matte phase is formed as one of the products or intermediates. The applicants have further found that the metal phase as specified above is highly suitable for the recovery of the valuable metals listed by pyrometallurgical process steps, as is described below in this document.

The applicants have further found that the high amount of copper in the metal phase may be made to act as an extracting agent for other valuable metals, such as nickel, tin and lead, from the slag phase, and hence contributes on its own also to a high recovery of these metals other than copper.

The applicants have further found that the compliance with the lead content as specified brings advantages in the recovery of the even more economically advantageous metal tin, because the tin and lead may be recovered as a solder-type by-product stream which, thanks to the lead content, may suitably be tuned and subsequently be distilled for the recovery of a high purity tin prime product, together with lead-containing by-products of different qualities that are also of value.

In an embodiment of the process according to the present invention, the liquid bath in the furnace has a temperature in the range of 1100-1300° C., preferably at least 1120° C., more preferably at least 1140° C. or even 1150° C., and optionally at most 1250° C., preferably at most 1200° C., more preferably at most 1180° C. The applicants have found that this temperature range may bring the advantage of sufficient slag fluidity and adequate fuming of zinc already from the smelting step, while maintaining a low fuming rate of tin and/or lead from the smelting step, hence contributes to a high recovery of tin and/or lead and/or zinc and a high operability of the smelting step. The applicants prefer to let the furnace content cool down to at most 1140° C. before metal is removed from the furnace. The applicants have found that this precaution contributes to a longer service life of the containers in which the molten metal is received and transferred to the subsequent process step.

In an embodiment of the process according to the present invention, the exhaust gases from the furnace are collected and treated by cooling and/or filtration. The applicants have found that the exhaust gases from the smelting step contain valuable metals that are worth recovering, and that the treatment as specified also reduces the environmental concerns associated with the release of smelting step exhaust gases to the atmosphere.

In an embodiment of the process according to the present invention, also secondary exhaust gases from around the furnace are collected and treated by filtration, optionally in combination with cooling. The applicants have found that this feature further reduces the environmental concerns that may be associated with the operation of the furnace in accordance with the present invention.

In an embodiment of the process according to the present invention, the smelting is performed in a smelting furnace.

A smelting furnace offers the advantage of being simple in operation and in equipment, hence economically advantageous. A smelting furnace brings the further advantage of being tolerant in terms of raw material quality. A smelting furnace is able to accept raw materials that are highly diluted and/or contaminated with a wide variety of components, such as a wide variety of organics. In a smelting furnace the metals are molten, and organics and other combustible materials are burned off. Because these mixed and/or contaminated raw materials have hardly any other end-use, they may be supplied at economically very attractive conditions. The capability of processing these raw materials and upgrading the valuable metals contained therein, is therefore of interest to the operator of the process according to the present invention.

A smelting furnace is a fairly simple and cheap apparatus consisting of a large cylinder-shaped furnace which only needs to be able to tilt around its longitudinal axis over a part of a full circle. This finding brings the advantage of a low capital investment and/or operating expenses for performing the smelting step.

In an embodiment of the process according to the present invention, the walls of the furnace are cooled at least partially over the furnace wall surface. This brings the advantage of reduced wear and tear of the furnace wall, and in particular for the moveable parts provided as part of the means for moving the furnace with the purpose that the liquid bath may be agitated, and for enhancing and/or controlling the bath agitation.

In an embodiment of the present invention, the process further comprises the step of fuming the slag phase formed in the smelting step to obtain a fumed slag, preferably the fuming being performed in a fuming furnace. The fuming step produces a fumed slag, together with at least a dust containing most of the metals that have been fumed from the smelting slag, typically in their oxidized form. The applicants have found that it is advantageous to provide this extra process step, because it broadens the acceptance criteria for the raw materials of the smelting step by including raw materials that contain more zinc, and optionally also lead. Such raw materials are often difficult to process in alternative processes where they may represent a process and/or economic burden, and may therefore be made available in a higher abundancy and at more attractive economic conditions. A zinc fuming step may be performed such as described by Michael Borell in, "Slag—a resource in the sustainable society", during "Securing the Future", an International Conference on Mining and the Environmental Metals and Energy Recovery, which took place in Skellefteå, Sweden in 2005, pp 130-138 of the proceedings. The applicants however prefer to perform such an extra fuming step as disclosed in WO 2016/156394 A1.

In an embodiment of the process according to the present invention, the slag when removed from the smelting step or from the fuming step is granulated. Preferably the slag from the smelting slag and/or the slag from the fuming step is removed from the respective furnaces as a liquid. The advantage is that the furnace may be released for further production and/or slag treatment while the obtained slag is cooling down. The slag may be cooled and/or solidified by contacting the slag with a cooling medium, such as air, possibly ambient air.

In an embodiment of the process according to the present invention, the cooling of the slag is performed by contacting the liquid slag with water. The applicants have found that cooling with water is very effective and may be applied in a variety of ways resulting in relatively well controlled cooling rates.

In an embodiment of the process according to the present invention, the process further comprises the step of using the produced slag in an end-use selected from providing a wear layer and/or coating for roofing tiles or roofing shingles, as a blasting sand or blasting grit component, as a foamed tile component as a black colorant, preferably in construction products, more preferably in black tiles, as black hard chunks, preferably for decorative purposes, and as a high density ballast, preferably for underwater applications, more preferably for hydraulic engineering, and for combinations thereof.

In an embodiment of the process according to the present invention for producing an object for the construction industry, the process further comprises the step of adding the produced slag as an aggregate and/or as a binder during the production of an object for the construction industry, preferably as a binder for aggregates, preferably as an active binder, more preferably as a binder having pozzolanic activity, even more preferably as a replacement for Portland cement, even more preferably as a partial replacement of Portland cement.

In an embodiment of the process according to the present invention, the produced slag is added as a binder in an inorganic polymer composition, preferably in combination with a base, more preferably as the main binder in an inorganic polymer composition, even more preferably as the only binder in an inorganic polymer composition.

In an embodiment of the process according to the present invention wherein the produced slag is added during the production of an object for the construction industry, the process is further comprising the step of foaming the inorganic polymer composition.

In an embodiment of the process according to the present invention for producing an object for the construction industry, the object for the construction industry is a construction element, preferably the construction element being selected from the list of a tile, a paver, a block, a concrete block, and combinations thereof.

In an embodiment of the process according to the present invention for producing an object for the construction industry, the object for the construction industry is having a foamed structure.

In an embodiment of the process according to the present invention for producing an object for the construction industry, the process further comprises the step of using the object for improving thermal and/or sound insulation, for shielding X-rays, and combinations thereof.

In an embodiment of the process according to the present invention, the process further comprises the step of refining the concentrated copper intermediate to obtain a refined copper product together with at least one copper refining slag. The applicants have found that this refining step may suitably be performed as described in WO 2019/115543 A1.

In an embodiment of the process according to the present invention wherein the concentrated copper intermediate further comprises tin and lead, the process further comprising the recovery of a crude solder metal composition from the concentrated copper intermediate, This recovery of a crude solder metal may suitably be performed as described in WO 2019/115524 A1.

In an embodiment of the process according to the present invention comprising the recovery of a crude solder metal composition, the process further comprises the step of recovering from the crude solder metal composition at least one of a purified soft lead product, a purified hard lead product and a purified tin product. The applicants have found that the crude solder metal composition is a highly suitable feedstock for recovery of at least one of the listed products, preferably at least the purified tin product, more preferably in addition also one of the purified lead products, and even more preferably both purified lead products.

In an embodiment of the process according to the present invention comprising the recovery of a crude solder metal composition, the process further comprises the step of pre-refining the crude solder metal composition to produce a pre-refined solder metal composition.

The crude solder metal composition that may be obtained as a by-product from the refining of the concentrated copper intermediate obtained from the process according to the present invention, may be further pre-refined or treated to remove more of its contaminants, in particular copper. This may be performed by contacting the crude solder metal composition, as a molten liquid, with elemental silicon and/or aluminium, elements which bind under the operating conditions with Cu, Ni and/or Fe and form a separate silicide and/or aluminide alloy phase. The applicants prefer to use silicon and/or aluminium containing scrap. Preferably the added material further comprises Sn and/or Pb, because these metals are readily upgraded into the respective prime products when introduced at this process stage. Because of the typical presence of Sb and As in the crude solder metal composition, the applicants prefer to use silicon and to avoid aluminium, although this is usually more readily available and more reactive. This avoids the formation of $H_2S$, a toxic gas, and more exothermic reactions in the treatment vessel, and also avoids that the resulting alloy phase by-product, in contact with water, could generate stibine and/or arsine, highly toxic gases. The applicants have found that the silicon feed for this treatment step may contain a limited amount of iron (Fe), readily more than 1% wt and readily up to 5% wt or even up to 10% wt of Fe. The process may thus be operated using Si products that are unacceptable for other silicon consumers, such as reject material from the production line, and which may thus be more readily available. The applicants have found that the burden of processing this extra Fe, which also binds with Si, is typically readily compensated by the advantageous conditions for the supply of the silicon source.

This pre-refining may suitably be performed as described in WO 2019/115524 A1, and produces a so-called "cupro phase" by-product, which may, preferably after having been "washed" as described, advantageously be recycled to the smelting step of the process according to the present invention.

In an embodiment of the process according to the present invention comprising the recovery of a crude solder metal composition, the process further comprises the step of tuning of the crude solder metal composition or the pre-refined solder metal composition to produce a tuned solder metal composition. This tuning step is able to further prepare the solder such that it becomes suitable for vacuum distillation, a technically highly demanding process step which is sensitive to excessive presence of particular metal contaminants. Such tuning and distillation may suitably be performed as described in WO 2018/060202. A1.

In an embodiment of the process according to the present invention producing a tuned solder metal composition, the process further comprises the step of a first distillation for distilling the tuned solder composition wherein lead is removed from the solder by evaporation and a first distillation overhead product and a first distillation bottom product are obtained. Such a first distillation may suitably be performed as described in WO 2018/060202. A1.

In an embodiment of the process according to the present invention producing the first distillation overhead product, the process further comprises the step of removing at least one contaminant selected from the metals arsenic, antimony and tin from the first distillation overhead product to obtain a purified soft lead product. Preferably the purified soft lead product is produced as described in WO 2020/157165 A1.

In an embodiment of the process according to the present invention comprising the first distillation step, the first distillation bottom product of the first distillation step contains lead and silver, and the process is further comprising the step of separating the bottom product of the first distillation step by fractional crystallisation into a first silver-enriched liquid drain product at the liquid end of the crystallisation step and a first tin-enriched product at the crystal end of the crystallisation step. The applicants prefer to perform this separation as described in WO 2020/157167 A2.

In an embodiment of the process according to the present invention comprising the fractional crystallization step, the process further comprises the step of separating the first silver-enriched liquid drain product into a product rich in lead plus tin and a product rich in silver, preferably by electrolysis whereby the anode slime represents the product rich in silver. The applicants prefer to perform this separation as disclosed in WO 2020/157167 A2.

In an embodiment of the process according to the present invention producing the first tin-enriched product and the first tin-enriched product further contains lead and antimony, the process further comprises the step of a second distillation for distilling the first tin-enriched product, wherein primarily lead and antimony are evaporated and a second distillation overhead product and a second distillation bottom product are obtained.

In an embodiment of the process according to the present invention comprising the second distillation step, the process further comprises the step of a third distillation for distilling the second distillation overhead product, wherein lead is evaporated and a third distillation overhead product and a third distillation bottom product are obtained, preferably the third distillation bottom product at least partially being recycled to the feed of the second distillation step and/or the feed of the fractional crystallisation step.

In an embodiment of the process according to the present invention comprising the third distillation step, the process further comprises the step of removing at least one contaminant selected from the metals arsenic and tin from the third distillation overhead product to obtain a purified hard lead product. The applicants prefer to perform this step as described in WO 2020/157168 A1.

In an embodiment of the process according to the present invention comprising the second distillation step, the process further comprises the step of refining the second distillation bottom product to obtain a purified tin product. The applicants prefer to perform this step as described in WO 2020/157168 A1.

In an embodiment of the process according to the present invention comprising the refining of the concentrated copper intermediate to obtain a refined copper product, the process further comprises the step of casting the refined copper product to produce refined copper anodes. The applicants have found that the refined copper product in the form of copper anodes makes the product highly suitable for a further electrolytic process step for the production of copper cathodes of high purity, together with anode slimes that may be further processed for the recovery of the metal values contained therein. The applicants prefer to perform this electrolytic purification process step as described in WO 2019/219821 A1.

In an embodiment of the process according to the present invention, at least a part of the process is electronically monitored and/or controlled. The applicants have found that the control of steps from the process according to the present invention electronically, preferably by a computer program, brings the advantage of a much better processing, with results that are much more predictable and which are closer to the process targets. For instance on the basis of temperature measurements, if desired also pressure and/or level measurements and/or in combination with the results of chemical analyses of samples taken from process streams and/or analytical results obtained on-line, the control program may control the equipment relating to the supply or removal of electrical energy, supply of heat or of a cooling medium, a flow and/or a pressure control. The applicants have found that such monitoring or control is particularly advantageous with steps that are operated in continuous mode, but that it may also be advantageous with steps that are operated in batch or semi-batch. In addition and preferably, the monitoring results obtained during or after the performance of steps in the process according to the present invention are also of use for the monitoring and/or control of other steps as part of the process according to the present invention, and/or of processes that are applied upstream or downstream of the process according to the present invention, as part of an overall process within which the process according to the present invention is only a part. Preferably the entire overall process is electronically monitored, more preferably by at least one computer program. Preferably the overall process is electronically controlled as much as possible.

The applicants prefer that the computer control also provides that data and instructions are passed on from one computer or computer program to at least one other computer or computer program or module of the same computer program, for the monitoring and/or control of other processes, including but not limited to the processes described in this document.

The invention as claimed is further illustrated by FIG. 1, showing a process flow sheet of an overall process as a preferred embodiment that is comprising the process steps according to claim 1 for the recovery of a concentrated copper intermediate.

In FIG. 1, the following reference numerals refer to the following process steps or streams:
  100. Smelting step or Smelter
  200. Copper refinery
  300. Copper anode casting
  400. Slag fuming step
  500. Lead/Tin Recovery
  1. Coarse feedstock portion
  2. Finely divided feedstock portion or dust
  3. Black copper as the concentrated copper intermediate
  4. Smelter dust by-product from the smelting furnace
  5. Smelting slag
  6. Refinery Slag
  7. Crude Solder by-product from the copper refinery
  8. Refined Copper
  9. Copper Anode Product
  10. Soft Lead product
  11. Hard Lead product
  12. Refined Tin product
  13. Fumed Slag
  14. Fumer dust by-product from the fuming furnace FIG. 1 shows that the coarse feedstock portion 1 and the finely divided feedstock portion 2 are fed to the smelting furnace 100 where the oxygen containing gas (not shown) is injected for controlling the reactions in the furnace and hence also the temperature in the furnace. The furnace exhaust gases are cooled and filtered, whereby smelter dust 4 is collected. Smelting slag 5 is removed from the furnace and fed to fumer step 400 to recover fumer dust 14 and to produce end slag or so-called "clean slag" 13 as the second slag.

Black copper 3 as the concentrated copper intermediate is fed to the copper refinery 200, which produces a refined copper product 8, a crude solder by-product 7 and a refinery slag 6. The refinery slag 6 may be routed to the fumer 400 to increase the amount of end slag 13 and fumer dust 14. The refined copper 8 is fed to the copper anode casting step 300 to produce copper anodes 9. The crude solder 7 is routed to the lead/tin recovery step 500, in which a soft lead product 10, a refined tin product 12, and optionally a hard lead product 11 are produced.

The applicants have found that the beneficial technical effects of the present invention, not only but especially the more stable and reliable operation of the smelting step 100, readily transfer downstream and all the way through down to the production of the derivatives 9, 10, 11, 12, 13 and 14 shown in FIG. 1. The derivative steps, thanks to the present invention, enjoy a more stable and reliable feed stream originating from the smelting step and hence are able to produce final products having a more stable and reliable quality. A further benefit is that the present invention reduces the monitoring burden and operator attention for operating the downstream process steps as well as the overall process.

EXAMPLE

In a rotating drum furnace having an internal diameter of 3 meter was retained a level of about 1.00 meter of liquid black copper as concentrated copper intermediate from the previous feed batch, representing an amount of about 113 metric tons.

The furnace was operated in semi-continuous mode during an operational period spanning about 16 consecutive months, using a repeated sequence of the following operating modes, during which each cycle relates to different premix feed batches that had been composed and collected by the selection of parcels from a large inventory of available raw materials:

Mode 1: From a suitable feed batch, coarse solid raw materials are gradually fed to the furnace. This mode is included if needed until a continuous layer of slag has been obtained that comes floating on top of the liquid metal phase, Mode 1+2: Provided a continuous layer of slag is present in the furnace, from another suitable premix feed batch composed for this purpose, finely divided feedstock, also called "dust", is transported pneumatically and injected into the liquid slag phase and above the metal phase of the liquid bath, typically also gradually over time, while the gradual feeding of coarse solid material is preferably also continued, Mode 3: Typically, but only if needed, as part of the operation once the feed batches have been finished and/or the furnace is considered full, a period is included during which the furnace conditions are maintained and the chemical reactions are allowed to proceed, and this until the desired composition of slag and metal are obtained.

Mode 4: Slag is poured from the furnace by tilting the rotating drum until the supernatant slag phase is at least partially overflowing through the feed port of the furnace. The slag was preferably transferred in the liquid form in a suitable container to a fumer furnace for the further recovery of zinc and optionally also of lead by fuming, and possibly also copper as part of a metal phase by-product of the fuming step. The slag obtained from this fuming step, but if the fuming step was not available the slag from the smelting step, was cooled, solidified and granulated by contacting the hot liquid slag with a large flow of water.

Mode 5: Metal is partially removed from the furnace, if convenient until again a minimum level of about 1.00 meter of liquid metal plus possibly some liquid slag remains in the furnace. The removal is performed, if the slag was fully removed by also allowing the metal phase to overflow via the feed port, and if only a portion of the slag phase had been removed the metal is tapped via a suitably located tap hole in the furnace wall.

After the removal of slag and/or metal in Mode 4 and/or Mode 5, i.e. when there has again been gained more room in the furnace, the feeding of raw materials is restarted, depending on the presence of slag in the furnace as in Mode 1 or Mode 1+2 above, and if the previous feed batch was finished, starting from a next feed batch.

If the downstream processing of the concentrated copper intermediate was requesting more feed material, a portion of the liquid metal phase was intermittently removed from the furnace before or without removing any of the supernatant slag phase just before or immediately after the removal of metal.

Extra flux material, also sometimes called "slag formers" as a translation of the term commonly used in the German language, typically sand, was added to the furnace on an as-needed basis for assuring sufficient slag fluidity. Before granulating the slag from the furnace or from the downstream fumer, extra silicon dioxide was added if needed in order to assure a correct ratio of Fe/Si such that the risk for generating hydrogen during the slag pouring and granulation, and the associated explosion risk, was under control. Over the period needed for processing the feed batch, on average a total of 11.5 tons of sand was introduced per feed batch into the furnace.

During Modes 1, 1+2 and 3, when needed for maintaining the furnace temperature, pure oxygen gas was injected via a lance that was introduced through the feed port. During these operational modes, when possible the drum furnace was rocked in order to agitate its liquid content.

During all operational modes compressed air was fed at a pressure of 10 bar gauge to the 4 tuyeres that were provided at suitable locations in the furnace wall below the liquid level, and injected into the furnace, primarily with the purpose of bath agitation, but also for introducing extra oxygen into the bath for taking part in the intended chemical reactions.

During the period considered, per feed batch a total amount of on average about 92.4 tons of coarse solid raw materials, including some return materials, were introduced into the furnace, as well as a total amount of about 23.2 tons of finely divided raw materials were introduced into the furnace. The coarse solid raw materials and the finely divided raw materials had the average composition as shown in Table I. Sufficient extra solid iron scrap was made part of the premixed feed batches of coarse solid raw materials, and fed to the furnace as a part thereof, to maintain a presence of solid iron floating on the metal phase. This amount of extra iron scrap introduced is thus included in the composition of the coarse solid raw materials of Table I.

TABLE 1

| Element (wt %) | Coarse | Dust |
| --- | --- | --- |
| Cu | 40.45 | 44.82 |
| Pb | 5.02 | 6.74 |
| Sn | 1.67 | 4.93 |
| Ni | 0.99 | 0.76 |
| Fe | 27.10 | 3.43 |
| Si | 1.99 | 1.70 |
| Al | 0.25 | 0.00 |
| Zn | 9.30 | 16.07 |
| Bi | 0.02 | 0.01 |
| As | 0.01 | 0.07 |
| Sb | 0.01 | 0.16 |
| CaO | 0.51 | 4.64 |
| SiO2 | 5.49 | 5.58 |
| Al$_2$O$_3$ | 1.33 | 1.75 |
| Total (wt %) | 94.14 | 90.66 |

Spread over the entire operation period considered, per feed batch on average a total of about 6.6 tons of oxygen was injected as compressed air at about ambient temperature in the bottom of the furnace through 4 tuyeres and as oxygen gas via the lance close to the interface between the metal phase and its supernatant slag phase. The temperature in the furnace could highly conveniently and accurately be maintained in the narrow range of 1150-1180° C. Most importantly, control of the oxygen injection allowed to avoid temperature excursions to above this range, such that the evaporation of tin and/or lead could be minimized. Control of the feed rates of the raw materials, including the coarse solid material as well as the dust injection, allowed to avoid temperature drops below the desired level, and the oxygen injection allowed to readily recover from a temporary temperature drop if such drop occurred. For the removal of metal from the furnace, the temperature was allowed to drop to about 1140° C. in order to reduce the risk for damaging the containers into which the molten metal was transferred.

The exhaust gases from the furnace were cooled and filtered for recovering the solids in the cooled gases as smelter dust.

Over the entire operating period considered, per feed batch on average the amounts of products and the compositions as shown in Table II were obtained and removed from the smelting furnace.

TABLE II

| Element (wt %) | Smelting Slag | Metal | Dust |
| --- | --- | --- | --- |
| Cu | 0.60 | 77.41 | 6.18 |
| Pb | 0.30 | 9.40 | 10.99 |
| Sn | 0.11 | 4.25 | 1.03 |
| Ni | 0.04 | 1.74 | 0.03 |
| Fe | 35.85 | 1.12 | 0.50 |
| Si | 0.00 | 0.00 | 0.00 |
| Al | 0.00 | 0.00 | 0.00 |
| Zn | 11.48 | 4.98 | 48.90 |
| Bi | 0.00 | 0.04 | 0.00 |
| As | 0.00 | 0.04 | 0.03 |
| Sb | 0.00 | 0.07 | 0.04 |
| CaO | 2.20 | 0.00 | 0.00 |
| SiO2 | 31.40 | 0.02 | 0.60 |
| Al$_2$O$_3$ | 3.58 | 0.00 | 0.01 |
| Total | 85.56 | 99.07 | 68.31 |
| Metric Tons | 70.1 | 61.1 | 2.5 |

The sulphur level of the metal phase obtained as concentrated copper intermediate from the process in the example was determined and for each feed batch found to be far below 2% wt, rather in the range of at most 0.25% wt. For each feed batch, the sulphur level in the slag was found to be at most 0.33% wt and in the dust at most 0.21% wt.

Having now fully described this invention, it will be appreciated by those skilled in the art that the invention can be performed within a wide range of parameters within what is claimed, without departing from the scope of the invention, as defined by the claims.

The invention claimed is:

1. A process for the recovery of copper from secondary raw materials comprising the step of, in at least one feed batch, smelting a feedstock comprising the raw materials in a furnace for the recovery from the furnace of a concentrated copper intermediate,
   whereby the feedstock of raw materials is introduced gradually into the furnace, the feedstock comprising copper, and optionally at least one metal that under the furnace operating conditions is more noble than tin, at least partly as an oxide,
   whereby the feedstock further comprises iron, and optionally at least one metal or compound that under the furnace conditions is at most as noble as iron or zinc, the iron and metal at most as noble as iron or zinc at least partly being present in their elemental form,
   whereby heat is generated inside the furnace by the redox reactions converting elemental iron and metals or compounds at most as noble as iron or zinc to oxides and converting oxides of copper and of metals more noble than tin to elemental metal,
   whereby the elemental metals at least partly collect in a molten liquid metal phase and the oxides at least partly collect in a supernatant liquid slag phase,
   whereby the liquid phases are able to separate out and at the end of the smelting step at least one of the liquid phases is at least partially removed from the furnace, whereby the slag phase is removed as a smelting slag and the metal phase is removed as the concentrated copper intermediate,
   wherein,
   during the smelting step an excess of the elemental form of iron and of metals or compounds that are under the furnace conditions at most as noble as iron or zinc is maintained in the furnace relative to the amount required for completing the redox reactions, and
   further heat input into the furnace is provided during the smelting step by the injection of an oxygen containing gas for the oxidation of the excess of iron and of metals or compounds at most as noble as iron or zinc present in the furnace and optionally for the combustion of a combustible source of carbon and/or hydrogen that may in addition be introduced into the furnace.

2. The process according to claim 1 wherein the feedstock further comprises at least one second metal selected from the group consisting of nickel, tin and lead.

3. The process according to claim 2 wherein the concentrated copper intermediate further comprises the at least one second metal.

4. The process according to claim 1 whereby the feedstock is at least partly solid and whereby the solid feedstock is fed gradually to the furnace.

5. The process according to claim 1 whereby at least a portion of the feedstock is in the form of a finely divided portion, and the finely divided feedstock portion is having an average particle size of at most 10 mm.

6. The process according to claim 1 whereby the level of iron and metals or compounds at most as noble as iron or zinc dissolved in the molten metal inside the furnace is maintained at least at 1.0% wt, whereby the concentration of the metals and compounds at most as noble as iron or zinc is converted to an equivalent iron concentration, whereby the equivalent iron concentration is the iron concentration that is able to contribute the same amount of reaction heat as the metal or compound at most as noble as iron or zinc when reacting with oxygen under the furnace conditions.

7. The process according to claim 1 whereby at least part of the oxygen containing gas is introduced by means of at least one metal lance of which the tip is submerged into the liquid slag phase.

8. The process according to claim 1 whereby at least a part of the oxygen containing gas is introduced in the bottom of the furnace through at least one tuyere.

9. The process according to claim 1 whereby the composition of the concentrated copper intermediate as the prime product from the smelting step complies with at least one of the following conditions:
   comprising at least 50.0% wt of copper (Cu),
   comprising at least 0.01% wt of nickel (Ni),
   comprising at least 0.10% wt of lead (Pb),
   comprising at least 1.00% wt of tin (Sn),
   comprising at least 0.05% wt of iron (Fe),
   comprising at least 0.10% wt of zinc (Zn), and
   comprising at most 5% wt of sulphur(S).

10. The process according claim 1 further comprising the step of fuming the slag phase formed in the smelting step to obtain a fumed slag.

11. The process according to claim 1 further comprising the step of adding the smelting slag that is produced by the process as an ingredient selected from an aggregate and as a binder during the production of an object for the construction industry.

12. The process according to claim 1 further comprising a step of refining the concentrated copper intermediate to obtain a refined copper product together with at least one copper refining slag.

13. The process according to claim 12 wherein the concentrated copper intermediate further comprises tin and lead, the process further comprising the recovery of a crude solder metal composition from the concentrated copper intermediate.

14. The process according to claim 13 further comprising a step of recovering from the crude solder metal composition at least one product selected from a purified soft lead product, a purified hard lead product and a purified tin product.

15. The process according to claim 12 further comprising a step of casting the refined copper product to produce refined copper anodes.

* * * * *